United States Patent [19]

Kern et al.

[11] 4,358,485
[45] Nov. 9, 1982

[54] METHOD FOR FORMING A POROUS ALUMINUM LAYER

[75] Inventors: James W. Kern, Kenmore; Tommy M. Tetreault, Grand Island, both of N.Y.

[73] Assignee: Union Carbide Corporation, Danbury, Conn.

[21] Appl. No.: 131,012

[22] Filed: Mar. 17, 1980

[51] Int. Cl.$^3$ ............................................ C23C 17/00
[52] U.S. Cl. ................................ 427/376.8; 427/380; 165/133
[58] Field of Search ...................... 427/192, 376.8, 380

[56] References Cited

U.S. PATENT DOCUMENTS

| | | | |
|---|---|---|---|
| 2,785,084 | 3/1957 | Lundin | 427/310 |
| 3,384,154 | 5/1968 | Milton | 165/1 |
| 3,607,369 | 9/1971 | Batta | 427/192 |
| 3,951,328 | 4/1976 | Wallace | 228/207 |
| 3,971,501 | 7/1976 | Cooke | 228/248 |

FOREIGN PATENT DOCUMENTS 1055914  1/1967  United Kingdom .

*Primary Examiner*—Ralph S. Kendall
*Attorney, Agent, or Firm*—A. H. Fritschler

[57] ABSTRACT

A method for forming a porous aluminum surface on an aluminum substrate using a potassium fluoaluminate brazing flux in critical weight ratio of 0.05 to 0.6 with an aluminum powder matrix component.

6 Claims, 1 Drawing Figure

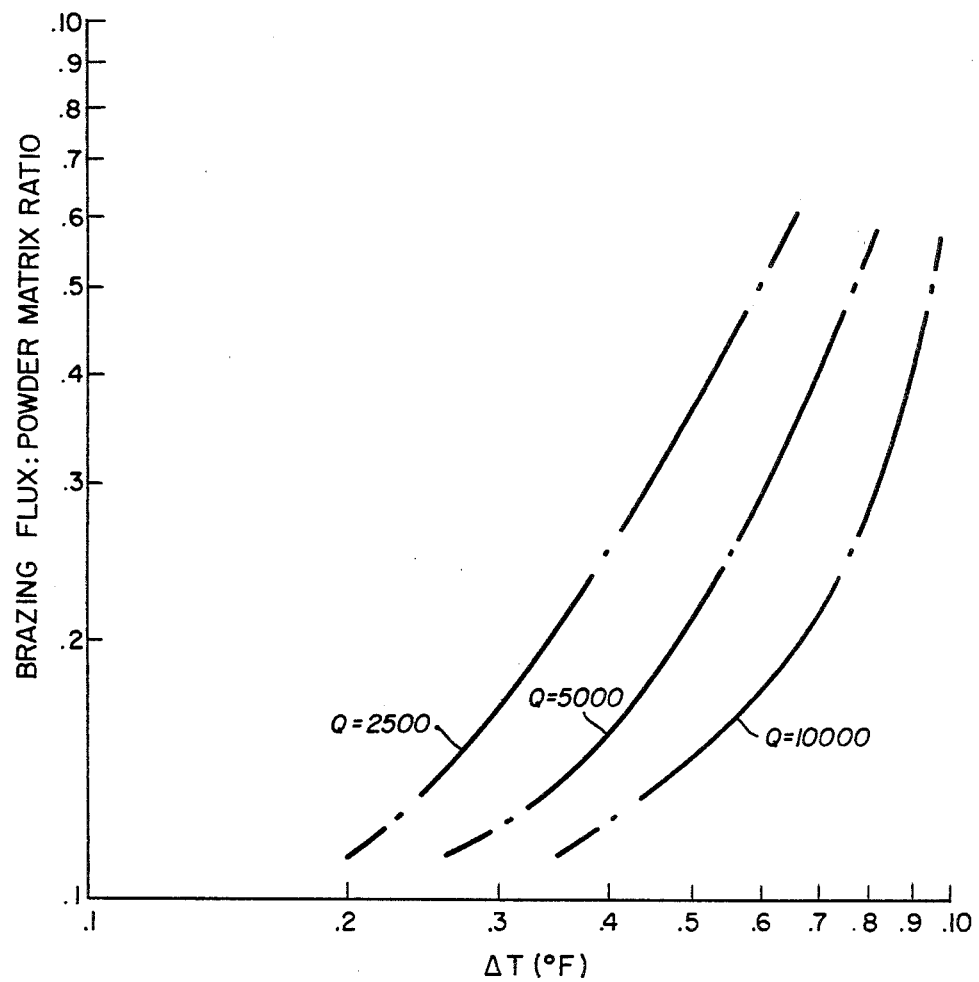

METHOD FOR FORMING A POROUS ALUMINUM LAYER

1. Field of Invention

This invention relates to a method for forming a thin porous aluminum layer on an aluminum or aluminum alloy substrate material. More particularly, this invention relates to such a method using a particular physical mixture of aluminum brazing-related components to form such porous aluminum layer.

2. Background of the Invention and Prior Art

R. M. Milton in U.S. Pat. No. 3,384,154 describes a highly effective heat transfer surface for boiling liquids. The Milton surface comprises a metal matrix with interstitial interconnected pores formed by bonding a thin layer of metal particles to one another and to a metal substrate. Boiling heat transfer coefficients on the order of ten times greater than those obtained for mechanically roughened surfaces were observed with this improved structure.

The Milton patent describes a method for producing this heat transfer surface which involves sintering a metal powder matrix component onto a metal substrate. The powder matrix component is applied to the substrate by using a plastic binder, such as a solution of isobutylene polymer and kerosene, for initial adhesion of the particles in the matrix structure. The coating is then air-dried to remove the bulk of the kerosene and leave a matrix structure of the metal powder held in place by the plastic binder. The coating is then heated to just below the melting point of the metal powder so as to sinter the metal matrix in place and remove the binder by vaporization and/or decomposition.

It has been previously disclosed by Batta in U.S. Pat. No. 3,607,369 that the method disclosed in the aforementioned Milton patent cannot be satisfactorily used to form a thin porous aluminum layer on aluminum and aluminum base alloy substrates. In addition to the problem of metal deformation at sintering conditions common to most metals, it is extremely difficult to form an intermetallic bond with aluminum particles solely by sintering. It is well-known that aluminum surfaces readily oxidize upon exposure to air, and that the aluminum oxide surface coating thus-formed is not only difficult to remove, but is also a refractory. For this reason, aluminum surfaces containing continuous oxide coatings cannot be successfully sintered. Since the metal powders required for preparation of the Milton porous surface are characterized by an extensive surface area, the presence of the oxide coating presents a particularly troublesome situation. Removal of the oxide coating to allow the particles to be sintered together necessitates extremely complex and expensive processing operations.

The Batta patent discloses an alternative procedure to the Milton sintering method specifically useful in the preparation of porous heat transfer layers on an aluminum or aluminum-base alloy material. In the Batta invention, a slurry is prepared by the combination four components: a cleaned aluminum powder matrix component; a metal bonding component; an aluminum brazing flux powder; and a liquid vehicle. The slurry is applied to an aluminum substrate and the slurry-coated substrate is heated to a temperature below about 300° F. for sufficient duration to evaporate the liquid vehicle and form a dried metal coating. The metal-coated substrate is then further heated in an inert atmosphere to a temperature between about 950° F. and 1200° F. for sufficient duration to braze the metal coating to the substrate, thereby forming the enhanced boiling surface.

The cleaned powder matrix used in the Batta invention is selected from the group consisting of aluminum and brazeable aluminum-base alloys, and has at least some particles sufficiently small to pass through a 35-mesh screen (based on U.S. Standard Screen Series). Any aluminum-base metals or alloys used as brazeable materials are suitable as the matrix powder and as the substrate. The melting point of the substrate and the matrix powder should not be less than about 1050° F. The powder matrix material is the component that actually forms most of the porous layer structure.

According to Batta, the metal bonding component is selected from the group consisting of zinc and aluminum alloys having 7% to 13% by weight silicon. This component has a lower melting point than the cleaned aluminum powder matrix material. The purpose of the aluminum bonding component is to form a structural bond between the individual particles of the aluminum powder matrix component and between the aluminum powder matrix component and the aluminum substrate. The aluminum metal bonding component is provided in a quantity such that the molar ratio thereof to the cleaned powder matrix component is between about 0.02 and 0.15.

The aluminum brazing flux powder of the Batta invention includes alkali metal chloride as its major constituent and reactive metal halide and metal fluoride as minor constituents. These materials are now commonly used as fluxing agents for brazing aluminum in a variety of applications. The brazing flux powder removes oxide films from the aluminum substrate and the cleaned aluminum powder matrix component so as to expose bright clean surfaces which are easily wetted by the metal bonding component. The reactive metal halide component of the brazing flux penetrates and loosens the oxide film of the aluminum material. The brazing flux powder is provided in sufficient quantity such that the molar ratio thereof to the matix component is less than about 0.1. Furthermore, the molar ratio of the aluminum bonding component plus the brazing flux to the matrix component is between about 0.05 and 0.2.

The final component required to produce the Batta slurry is the liquid vehicle. In the Batta invention, the vehicle is preferably organic in nature. The function of the vehicle is to temporarily suspend the solid powder ingredients in a slurry having a paint-like consistency. The vehicle must be liquid at room temperature, relatively non-reactive chemically with the other ingredients and have a high volatility and low latent heat. The preferred vehicle in the Batta invention is methanol although other organic liquids such as acetone or ethanol could also be used.

One principal shorcoming of the aluminum brazing flux powder used in the Batta invention is the hygroscopic nature of the brazing flux, hereinafter referred to as the halide flux. As recognized by Batta, the halide flux is hygroscopic and corrosive to the metal matrix. If allowed to remain in the metal matrix after brazing, the halide flux will cause corrosion and disintegration of both the porous layer and the heat transfer substrate. Batta also noted that after brazing, residual halide flux fills the pores of the porous layer matrix and prevents proper boiling performance of the porous surface. As a result of the foregoing, Batta teaches that the halide flux residue must be completely removed after the formation of the porous surface. As disclosed by Batta, the halide flux residue can be conveniently removed by the use of stringent but ordinary washing procedures provided that the brazed porous layer is less than about 0.125 inch in thickness.

Although Batta has shown that the halide flux residue can be removed by a proper washing procedure, it has been found that the use of the halide flux unduly increases the cost associated with formation of the porous surface. In the first place, stringent precautions must be followed to ensure that moisture does not contaminate the halide flux during the overall coating procedure. As previously noted, the combination of the halide flux and water is exceedingly corrosive to aluminum and aluminum alloys. Typically, the halide flux is processed at an elevated temperature and in a moisture free environment. This entails also heating the other powder components so as to expel moisture from them as well. A moisture-free nitrogen gas is typically used as a carrier gas. Obviously, all these processing steps must also be performed in an enclosed environment to prevent exterior moisture contamination. After the coating and brazing of the porous layer is completed, a careful control of the washing procedure must also be maintained. It is imperative that all residual flux be removed. Furthermore, an appropriate quality assurance program must also be employed as a further assurance program that all of the flux residue is removed. This quality assurance program adds even further expense to the overall process. However, since the failure to remove all of the residual halide flux will lead to undesirable corrosion and premature destruction of the porous layer as well as the heat transfer substrate, these procedures are essential elements of the overall Batta process. Nonetheless, even with a proper quality assurance program, there may well be some instances in which corrosion is still a problem.

Other prior art such as British Pat. No. 1,055,914-discloses a process for making a flux for soldering (brazing) aluminum and its alloys. The flux consists of a physical mixture of potassium fluoride and aluminum fluoride in the proportions of 47 to 45% and 53 to 55% respectively. The mixture is formed by first intermingling the two components and then moistioning the mixture with water until it forms a paste-like slurry. The paste is then dried at a temperature below 200° C. The reference discloses that the fused flux residue remaining after soldering (brazing) is stable and resistant to moisture (i.e., non-hygroscopic). Barring any extraneous reactions, the flux residue would comprise a mixture of potassium fluoaluminate complexes. This patent merely discloses the use of this flux in a surface bonding of parts and in no way relates to the manufacture of a porous surface.

U.S. Pat. No. 2,785,084-Ludin-discloses a method for coating, by batch or continuous processes, ferrous metals with aluminum. The patent does not specifically disclose the coating or bonding of aluminum to aluminum. The function of the aluminum coating is to provide a rust-resistant coating on the ferrous metal. The process employs a flux comprising a double fluoride of an alkali metal and aluminum. The process includes applying the flux in an aqueous slurry to the surface of the metal, drying the slurry coated article so as to provide a dry coating of flux on the base metal and then bringing the flux-coated base metal into contact with molten aluminum. The process does not include any brazing alloy in the formulation. In particular, the flux comprises a double fluoride of an alkali metal and aluminum containing from 35% to 70% by weight $AlF_3$. The double fluoride includes both distinct chemical compounds of the alkali metal, aluminum and fluorine as well as physical mixtures of alkali metal fluorides and aluminum fluorides. The patent specifically indicates that as far as the fluxing action of the flux is concerned, it is irrelevant whether the flux is used as a distinct chemical compound or as a physical mixture. The patent specifically indicates that it is necessary for the flux to be molten at the temperature of the molten aluminum. Preferably, the flux is molten 25° C. lower than the temperature of the molten aluminum. The patent specifically teaches that a mixture of $AlF_3$ and $K_3AlF$ can be used as the fluxing agent.

U.S. Pat. No. 3,951,328-Wallace et al.-discloses and claims a flux for joining metal surfaces of aluminum or aluminum alloys by brazing. The flux consists of a mixture of potassium fluoaluminate complexes which is essentially free of unreacted potassium fluoride.

As pointed out in the patent, the principal advantage of this new flux is that it is non-hygroscopic and thereby avoids the problems caused by using the conventional halide fluxes. The conventional halide fluxes are water soluble and are corrosive to aluminum in the presence of moisture. As a result, use of the halide fluxes requires that any flux residue left after the brazing operation be completely removed by a thorough washing. The post-treatment step, necessary to ensure that all residual flux is completely removed, introduces considerable expense into the brazing operation. Just a small amount of residual halide flux will subsequently cause severe corrosion problems. Moreover, halide fluxes can only be stored for short time periods prior to their use because of their hygroscopic nature. Since the mixture of potassium fluoaluminate complexes of the Wallace invention is non-hygroscopic, no post-brazing cleaning steps are necessary to avoid corrosion and the flux mixture can be stored for long periods of time prior to use.

U.S. Pat. No. 3,971,501-Cooke-pertains to a method for actually using the brazing flux disclosed and claimed in U.S. Pat. No. 3,951,238-Wallace et al. The flux is applied with a water vehicle in combination with a brazing alloy powder. Briefly, the invention is limited to a system in which the flux is applied to one of the metal articles as a paste in combination with a brazing metal alloy. The article with the layer of paste is then heated to remove all of the water vehicle and the surface is then further heated to a temperature at which the brazing alloy melts and the brazed joint is formed. The system is then cooled to yield the brazed joint.

Objects It is an object of this invention to provide an improved brazing method for forming a thin porous aluminum layer on an aluminum substrate.

It is another object of this invention to provide an improved brazing method for the production of an enhanced boiling surface of an aluminum substrate which eliminates the need for special post-cleaning procedures to remove residual flux.

Yet another object of this invention is to provide an improved brazing method for forming a porous layer on an aluminum substrate which functions as a highly effective boiling heat transfer surface.

These and other objects will be pointed out or become apparent from the following description and drawings.

BRIEF DESCRIPTION OF THE FIGURE

The FIGURE is a graph showing the effect of changing flux to powder matrix ratios on temperature difference across an aluminum tube coated according to the invention.

SUMMARY OF THE INVENTION

According to the method of this invention, the cleaned substrate, comprised of aluminum or an aluminum alloy, is loosely coated with a slurry formed with the components described below under "Description of Best Mode". The slurry coated substrate is then heated to a temperature below about 300° F. for sufficient duration to at least partially evaporate the liquid vehicle and form a dried metal-powder coating on the substrate. The now metal-coated substrate is then further heated, preferably in an inert or reducing atmosphere, to a temperature between approximately about 1050° F. and 1200° F. for sufficient duration to braze the metal coating to the substrate as the porous aluminum layer matrix.

Description of Best Mode

The present invention provides an improved method for forming a porous aluminum layer on aluminum or aluminum alloy substrates wherein a slurry composed of various components is coated onto the substrate, dried and brazed to form the desired porous layer. The various components of the slurry include: a cleaned aluminum powder matrix component having at least some particles sufficiently small to pass through a 35 mesh screen and selected from the group consisting of aluminum and aluminum-base alloys; an aluminum metal bonding component in powder form, in quantities such that the weight ratio thereof to the matrix component is between about 0.15 and 0.35, the aluminum metal bonding component being selected from the group of aluminum alloys having 6.8% to 13% by weight silicon; an aluminum brazing flux powder; and an inert liquid vehicle. The slurry is loosely coated on a metal substrate selected from the group consisting of clean aluminum and aluminum alloys. The cleaned, slurry-coated substrate is then heated to at least partially evaporate the liquid vehicle and form a dried metal-containing porous layer on the substrate. The substrate having the dried metal-containing porous coating is then further heated in an inert atmosphere to a temperature between about 1050° F. and 1200° F., for sufficient duration to braze the metal particles of the coating to the substrate and to one another in randon stacked relation as a uniform matrix with interstitial and interconnected pores between adjacent particles.

The improvement of the present invention comprises using a mixture of potassium fluoaluminate complexes as the aluminum brazing flux powder. The weight ratio of the brazing flux powder to the matrix component is between about 0.05 and 0.6. Preferably, the weight ratio of the brazing flux powder to the powder matrix component is between about 0.1 and 0.4. In the specific application of this boiling heat transfer enhancement for boiling low surface tension fluids such as, oxygen, a brazing flux powder to matrix component weight ratio of between about 0.1 and 0.2 should be employed in the preparation of the slurry coating. As used in this invention, the mixture of potassium fluoaluminate complexes must have an aluminum fluoride to potassium fluoride molar ratio between about 0.79 and 1.0 (this corresponds to an aluminum fluoride to potassium fluoride weight ratio between about 1.13 and 1.44).

The characteristics of each component of the slurry used in the invention is as follows:

The Matrix Component-Any of the aluminum and aluminum-base alloy powders suitable in the practice of U.S. Pat. No. 3,607,639-Batta are also suitable for use in the present invention. The melting point of the substrate and the matrix component should not be below about 1150° F., which is about 100° F. above the minimum brazing temperature provided by the eutetic mixture of potassium fluoaluminate complexes. A suitable matrix material is 3003 aluminum, which may have small quantities of copper (e.g., 0.20%), silicon (e.g., 0.60%), iron (e.g., 0.70%) and typically has 1.2% manganese.

The particles comprising the matrix powder may be of any shape, e.g., spherical, granular, or even thin flakes. The particles may comprise a wide variety of sizes, but at least some particles should be sufficiently small to pass through a 35 mesh screen (based on U.S. standard screen series) in order to produce pores of sufficiently small dimension to become active as nucleation sites at low temperature differences. If the particles are too large, they tend to settle out in the slurry and produce a reduced number of boiling cavities in the porous layer.

The Aluminum/Bonding Component-Because of the high surface area of the matrix material, a large quantity of the bonding component must be provided in order to ensure that particle contact points are securely bonded. The weight ratio of the bonding component to the matrix powder should be at least 0.15 so as to provide a strong matrix structure, and higher levels are preferred. This weight ratio should not be above about 0.35, since too large an amount of the bonding component tends to reduce the porosity and accordingly the number of boiling cavities in the porous surface. The bonding component is chosen to have a melting point lower than the matrix powder and the substrate. Furthermore, the bonding component must readily alloy with both the matrix powder and the substrate. Suitable aluminum bonding components are aluminum alloys having 6.8-13% (by weight) silicon. Bonding components that have been found to be particularly suitable are classified under the American Welding Society system as BAlSi-4 brazing filler alloys. The bonding component is also provided in powder form, typically satisfying the same size requirements as the matrix powder.

The Liquid Vehicle-As in the Batta invention, the function of the liquid vehicle is to temporarily suspend the aluminum matrix powder, the aluminum bonding component and the aluminum brazing flux ingredients of the mixture and form a slurry, preferably having a paint-like consistency. Suitable vehicles must be liquid at room temperature, relatively non-reactive chemically with the other ingredients, have a high volatility and a low latent heat. The preferred vehicle is a mixture of chlorethene and a thickening agent, although other vehicles such as methanol and ethanol can also be used. The vehicle is evaporated during the drying and brazing steps leaving the porous metal matrix. The slurry is applied to the substrate as a thin layer between 1 and 40 mils in thickness.

The Brazing Flux Powder-The final component of the slurry mixture is the potassium fluoaluminate brazing flux powder. This component represents the key departure of the slurry formulation of the present invention from the prior art. U.S. Pat. No. 3,951,328-Wallace et al. adequately discloses all of the relevant characteristics and preparation procedures for this flux powder. Briefly, methods of preparing the flux include: mixing and fusing potassium tetrafluoaluminate and potassium fluoride, mixing previously prepared potassium hexafluoaluminate and potassium tetrafluoaluminate, or mixing previously prepared potassium hexafluoaluminate and aluminum fluoride. It is also possible to use pure potassium tetrafluoaluminate as the flux powder.

It should be noted that the formuation of the porous layer is highly sensitive to the brazing temperature. Too low a temperature results in an inadequate degree of bonding and a structurally poor porous surface; while too high a temperature results in an over-fusing of the porous matrix, severely curtailing the number and size of the interstitial and interconnected pores forming the boiling surface. This result greatly reduces the boiling performances of the resulting surface. For these reasons, the furnacing temperature of the substrate should be maintained between about 1050° F. and 1200° F. In operation, it may be desirable to provide a furnace with graduated heat zones, which may for example begin at a temperature lower than the required brazing temperature, so as to gradually elevate the porous-coated article to brazing conditions.

To ensure that the flux melts and provides adequate fluxing action in this temperature range, the mixture of potassium fluoaluminate complexes must have a composition corresponding to an aluminum fluoride/potassium fluoride ratio in part by weight between 1.0 and 1.5. Preferably, the flux has a composition corresponding to an aluminum fluoride/potassium fluoride ratio in parts by weight between about 1.3 and 1.44.

Advantages of the Invention

The major improvement beyond the prior art method for forming such porous layers relates specifically to the discovery of the suitability of a mixture of known potassium fluoaluminate complexes as the brazing flux powder for this application. Use of these known aluminum fluxing agent provides several benefits in aluminum brazing applications relative to the halide fluxes generally used. These benefits include: the flux is not hygroscopic, thereby greatly relaxing storage and handling procedures to maintain its reactivity; the flux can be applied with a variety of liquid vehicles including water since it is non-hygroscopic; and the flux is only active near the brazing temperature and is inactive at lower temperatures, so that the expensive post-treatment procedure associated with the halide fluxes (i.e., the removal of the flux residue) is not required with this new flux.

Although most aluminum brazing applications can take advantage of the significant benefits provided by these potassium fluoaluminate brazing fluxes, the last enumerated benefit presents a potential dilemma for the successful application of these fluxes in the formulation of porous boiling surfaces. As was recognized by Batta, the presence of residual salts in the pores of the porous matrix apparently prevents proper boiling performance of the surface. This problem was necessarily circumvented in Batta as a result of the simultaneous need for removing the halide flux residue to avoid corrosion. In the present invention, there is no essential need to remove the potassium fluoaluminate flux residue for corrosion protection, and in fact, such a requirement would eliminate a major benefit of this flux in any particular aluminum brazing application. Indeed, the porous boiling heat transfer prior art teaching that removal of the brazing flux residue is necessary to ensure proper boiling performance of the enhancement would deter one of normal skill from attempting to employ the potassium fluoaluminate flux in the formulation of boiling surfaces. The inactive nature of the potassium fluoaliminate flux at temperature below the brazing temperature realistically precludes any possibility of easily removing the flux residue by normal washing techniques. Therefore, although the use of a brazing flux powder comprising a mixture of potassium fluoaluminate complexes seems to offer significant advantages relative to the halide fluxes used previously in many brazing applications, one of normal skill in the formation or porous boiling surfaces would not except that this brazing flux could be successfully adapted to the formuation of porous aluminum layers.

Nonetheless, we have quite unexpectedly found that there exists a proper proportioning of the quantity of aluminum powder matrix component and aluminum bonding component relative to the amount of brazing flux powder which not only provides the necessary fluxing action to produce a structurally strong porous layer but also produces a porous layer that exhibits excellent boiling performance. Specifically, we have found that as long as the weight ratio of the brazing flux powder to the matrix component is between about 0.05 and 0.6, then the resultant porous layer provides proper boiling heat transfer enhancement. Preferably, the weight ratio of the brazing flux powder to the powder matrix component is between about 0.1 and 0.4. In the specific application of the boiling heat transfer enhancement for boiling low surface tension fluids such as oxygen, a brazing flux powder to matrix component weight ratio of between about 0.1 and 0.2 should be used in the preparation of the coating. "In the context of this invention, the term "low surface tension fluids" refers to fluids having a surface tension below about 25 dynes/cm in the boiling environment."

The fact that such a quantity of brazing flux powder can be employed to provide the required fluxing action is entirely unexpected. Indeed, U.S. Pat. No. 3,951,328-Wallace et al. which pertains to the use of potassium fluoaluminate complexes in aluminum brazing applications indicates that flux loadings on the order of 175 to 350 gr./sq. meter should be employed to provide good bonding results. We have found that a flux loading of less than 75 gr. of flux per sq. meter of aluminum substrate is sufficient to provide the required fluxing action. If this number is instead calculated for the entire surface area of all the matrix particles to be bonded, which is a more realistic basis and is estimated to typically be greater than 200 sq.ft./lb. (0.041 sq. meter/gr.) of powder, the flux loading is actually below 25 gr. per sq. meter and in preferred practice is less than about 10 gr./sq. meter. This represents at least a 66% reduction in the flux loading taught by the Wallace et al. patent.

As noted earlier, the successful adaptation of the potassium fluoaluminate complexes as an aluminum brazing flux powder in the formation of porous surfaces for enhanced boiling heat transfer was entirely unexpected. Based on the teachings of Batta, i.e., the requirement of removing the residual flux particles from the porous surface, and the teachings of Wallace et al., i.e., that flux loadings of 175–350 gr./sq. meter are required to obtain good brazing results, considered in combination with the fact that at ambient conditions the potassium fluoaluminate complexes are for all practical purposes insoluble in all available solvents, one skilled in this area of art would have summarily dismissed the potential applicability of the potassium fluoaluminate complexes as an aluminum brazing flux in this application. Nonetheless, we have unexpectedly found that under a certain and well-defined range of conditions, the potassium fluoaluminate complexes can be successfully used in the manufacture of enhanced porous boiling surfaces.

The key to our successful adaptation of a mixture of potassium fluoaluminate complexes as a brazing flux for this particular application hinges on our discovery that at least insofar as porous surfaces are concerned, only a small level of flux is necessary to provide the required fluxing action. Moreover, at this small level of flux, the quantity of residual flux remaining in the porous structure does not interfere with proper boiling performance.

Examples and Data

Development of this invention was accomplished in conjunction with heat transfer testing in boiling nitrogen. The test work involved the actual coating of a heat transfer tube with powder mixtures containing the three solid components of the present invention.

The tubes were coated with a slurry prepared by mixing the three solid components of this invention, the aluminum matrix powder, the aluminum bonding component, the potassium fluoaluminate flux, with the liquid vehicle. The slurry was coated on the inside surface of a tube and then dried. The coatings were typically dried by blowing heated air over the tube outer surface, or through the tube. The tubes were then furnaced by slowly passing them through a four stage graduated temperature furnace having a hydrogen atmosphere. Various ratios of the three components were examined in an effort to find a suitable mixture. The weight ratio of the metal bonding component to the matrix component was fixed throughout this test work at 0.25. This is the same value used in the prior art method for the manufacture of aluminum porous boiling surfaces with the halide flux. Three separate weight ratios of the brazing flux powder to the matrix component were then examined, weight ratios of 0.5, 0.25 and 0.125.

Table 1 itemizes the samples that were heat transfer tested, noting the powder mixture composition, the liquid vehicle, and the powder mixture loading parameters. The samples were tested for their heat transfer performance (boiling heat transfer) in liquid nitrogen at different heat fluxes.

A small 3 inch aluminum tube section is fitted into a test apparatus. The tube is completely surrounded by an electrical resistance heater, which is forced to fit around the tube. The inside surface of the tube is coated with the boiling enhancement of this invention and liquid nitrogen is made available to the tube inner volume. Data is generated by applying a constant heat flux to the tube outside surface and measuring the temperature difference between the tube wall (measured through an embedded thermocouple) and the boiling nitrogen. The drawing illustrates the data in graphical form putting the wall temperature difference as the absicca and the brazing flux matrix component ratio as the ordinant, for three different heat fluxes. In each case, data for a given powder mixture represents the average of all the data taken for that powder mixture. The drawing vividly illustrates that as the weight ratio of the brazing flux powder to the powder matrix component is reduced, the boiling heat transfer performance is improved.

The drawing directly illustrates the reduction in $\Delta T$ for a given heat flux as the ratio of the brazing flux to the powder matrix component is reduced (as a function of three different heat fluxes). Based on these heat transfer results and empirical observations of the coating procedures, it has been determined that the weight ratio of the brazing flux powder to the aluminum matrix powder should be limited within the range of 0.05 and 0.6. On the other hand, if the weight ratio is below about 0.05, then the structural integrity of the resultant porous surface is questionable. This result apparently occurs because by failing to provide the necessary quantity of flux, the aluminum oxide coating, which acts as an impediment to the formation of a proper bond, is inadequately removed or dissolved. On the other hand, if the weight ratio is above about 0.6, then the heat transfer performance of the resultant surface is not adequate. This result is believed to be due to a reduction in the number of boiling cavities caused by residual flux either plugging or coating the interstitial openings. The specific value of 0.6 as the upper limit for the weight ratio is principally based on the graphical display which shows that at this ratio, the coated tube boils liquid nitrogen under a heat flux of 10,000 BTU/hr-ft$^2$ at a temperature difference ($\Delta T$) of approximately 1° F. Preferably, the weight ratio of flux to aluminum powder is in the range of 0.1 to 0.4. Once again the lower limit is dictated by preferred strength considerations, while the upper limit is defined by heat transfer performance. At flux to aluminum powder ratios below about 0.4, heat transfer surfaces manufactured by the process of this invention perform the same as or better than heat transfer surfaces manufactured by the prior art method.

The aluminum porous boiling surface of the present invention is particularly useful as the heat transfer tubing in the main condenser of an air separation column. In this application, the design temperature difference is a $\Delta T$ of less than 0.4° F. at a heat flux of 5000/BTU/hr-ft$^2$-°F. As shown directly by the plot, this performance is met when the brazing flux to powder matrix component ratio is below about 0.16. At the same heat flux and at higher ratios of the flux to the matrix powder component, the performance begins to degrade, yielding a temperature difference of about 0.77° F. at a flux to matrix component ratio of about 0.5. In this preferred practice, therefore, the ratio of the brazing flux powder to the powder matrix component is in the range of 0.1 to 0.2.

However, as noted previously, the porous boiling surface of the present invention has utility beyond its application in the main condenser of an air separation plant. In these other applications, the actual matrix structure of the porous boiling surface need not be the same as a surface to be used when boiling liquid oxygen. For example, if the surface is to be used to boil a high surface tension fluid such as water, the matrix structure will consist of much larger pore openings. In this instance, the quantity of flux relative to the quantity of the matrix powder can be increased without overly degrading the performance of the porous boiling surface. For this reason, in the broad practice of the present invention a ratio of the brazing flux to the matrix component has been set at 0.6.

In another experiment, the effect of further reducing the flux loading below a flux to matrix powder weight ratio of 0.125 was explored. In this particular experiment, a powder mixture was prepared with 100 gms. of Reynolds aluminum No. 120 as the powder matrix component, 25 gms. of Reynolds LSA-538 brazing filler alloy as the aluminum bonding component and 6.25 gms. of Ventron No. 1114 potassium fluoaluminate as the brazing flux powder. This corresponds to a brazing flux powder to powder matrix component weight ratio of 0.0625. The powder was then mixed into a 10% (by weight) Adsol 1260-Chlorethene mixture to produce a slurry of the desired consistency. This slurry was then applied to the inside surface of two aluminum tubes and air dried. One tube had a dried powder mixture coating of 475 gm./m², while the other tube had a dried powder mixture coating of 566 gm./m². Both tubes were fired in a furnace having four graduated heat zones ranging from 750° F. to 1200° F. and a hydrogen atmosphere and were subsequently cooled. Visual inspection of the resultant porous surface indicated a good bond strength with a fine porosity. Based on this result, the lower limit for the flux to aluminum powder weight ratio has been set at 0.05.

While the invention has been described with reference to the best mode of practicing the invention presently known, it is obvious that modifications may be made to the method without departing from the spirit and scope. For example, the slurry may be formed in situ by coating the substrate with the liquid vehicle and sprinkling the solid components on to the surface of the coated substrate.

TABLE 1

| SAMPLE | POWDER[1] MIXTURE | SOLVENT/BINDER | POWDER[2] MIXTURE LOADING |
|---|---|---|---|
| 1 | A | Methanol | 281 |
| 2 | B | Ethanol | 439 |
| 3 | B | Chlorethene/Adsol 1260 | 417 |
| 4 | C | Chlorethene/Adsol 1260 | 405 |
| 5 | C | Chlorethene/Adsol 1260 | 486 |
| 6 | C | Chlorethene/Adsol 1260 | 308 |
| 7 | C | Chlorethene/Adsol 1260 | 325 |
| 8 | C | Chlorethene/Adsol 1260 | 332 |
| 9 | C | Chlorethene/Adsol 1260 | 371 |

[1] A = 8 parts matrix powder[3]: 2 parts bonding component[4]: 4 parts brazing flux[5]
B = 8 parts matrix powder: 2 parts bonding component: 2 parts brazing flux
C = 8 parts matrix powder: 2 parts bonding component: 1 parts brazing flux
[2] Listed as gm/m² measured after partial drying but prior to brazing.
[3] Matrix component - Reynolds' Aluminum - No. 120 (except sample 3 - Alcoa Aluminum - No. 110)
[4] Bonding component - Reynolds brazing alloy LS-A-538
[5] Brazing flux - VENTRON No. 11114 Potassium Hexa fluoraluminate/Potassium Tetra fluoraluminate mixture

What is claimed is:

1. A method for forming a porous aluminum surface on a substrate taken from the class consisting of aluminum and aluminum base alloys comprising:
   (a) providing on said substrate a slurry composed of
      (i) an aluminum powder matrix component selected from the group consisting of aluminum and aluminum base alloys, said matrix component having a melting point above about 1150° F.;
      (ii) an aluminum metal bonding component selected from the group of aluminum alloys having 6.8% to 13% by weight silicon and being present in powder form and in quantities such that the weight ratio thereof to the matrix component (i) is between 0.15 and 0.35, said bonding component having a melting point lower than said matrix component;
      (iii) an aluminum brazing flux consisting of potassium fluoaluminates complexes the weight ratio of the brazing flux to the matrix component (i) being in the range of 0.05 to 0.6 and the weight ratio of aluminum fluoride to potassium fluoride in the potassium fluoaluminates being between 1.00 and 1.50; and
      (iv) an inert liquid vehicle;
   (b) drying the slurry on the substrate at a temperature less than 300° F. to at least partially evaporate the liquid vehicle and form a dried metal powder coating on the substrate; and
   (c) heating the coated substrate to a temperature in the range of from 1050° F. to 1200° F. for sufficient time to braze the metal coating to the substrate as the porous aluminum layer.

2. A method according to claim 1 wherein the ratio of brazing flux to matrix component is in the range of 0.1 to 0.4.

3. A method according to claim 1 wherein the ratio of brazing flux to matrix component is in the range of 0.1 to 0.2.

4. A method according to claim 1 wherein the aluminum fluoride to potassium fluoride weight ratio is between 1.13 and 1.44.

5. A method according to claim 1 wherein step (c) is conducted in an inert or reducing atmosphere.

6. A method for forming a porous aluminum surface on a substrate taken from the class consisting of aluminum and aluminum base alloys comprising:
   (a) forming a four component slurry consisting of:
      (i) an aluminum powder matrix component selected from the group consisting of aluminum and aluminum base alloys, said matrix component having a melting point above about 1150° F.;
      (ii) an aluminum metal bonding component selected from the group of aluminum alloys having 6.8% to 13% by weight silicon and being present in powder form and in quantities such that the weight ratio thereof to the matrix component (i) is between 0.15 and 0.35, said bonding component having a melting point lower than said matrix component;
      (iii) an aluminum brazing flux consisting of potassium fluoaluminate complexes, the weight ratio of the brazing flux to the matrix component (i) being in the range of 0.05 to 0.6 and the weight ratio of aluminum flouride to potassium flouride in the potassium fluoaluminates being between 1.00 and 1.50; and
      (iv) an inert liquid vehicle;
   (b) applying the slurry to said substrate as a thin layer between 1 and 40 mils thick;
   (c) drying the slurry at less than 300° F. to at least partially evaporate the liquid vehicle and form a dried metal powder coating on the substrate; and
   (d) heating the coated substrate to a temperature between 1050° F. and 1200° F. for sufficient time to braze the metal coating to the substrate as the porous aluminum layer.

* * * * *